(12) United States Patent
Iglesias et al.

(10) Patent No.: US 11,022,802 B2
(45) Date of Patent: Jun. 1, 2021

(54) DYNAMIC AMBIENT LIGHTING CONTROL

(71) Applicant: Apple Inc., Cupertino, CA (US)

(72) Inventors: Samuel L. Iglesias, Palo Alto, CA (US); In Young Yang, Kirkland, WA (US); Timothy R. Oriol, San Jose, CA (US); James C. McIlree, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/586,664

(22) Filed: Sep. 27, 2019

(65) Prior Publication Data

US 2020/0103656 A1 Apr. 2, 2020

Related U.S. Application Data

(60) Provisional application No. 62/738,899, filed on Sep. 28, 2018.

(51) Int. Cl.
*G02B 27/01* (2006.01)
*H04N 5/58* (2006.01)
*G02B 26/02* (2006.01)

(52) U.S. Cl.
CPC ......... *G02B 27/0172* (2013.01); *G02B 26/02* (2013.01); *H04N 5/58* (2013.01)

(58) Field of Classification Search
CPC .... G02B 27/0172; G02B 26/02; G02B 27/01; G02B 27/017; H04N 5/58; G06F 3/013; G06F 3/017; G06F 3/016; G06F 3/011
See application file for complete search history.

(56) References Cited

U.S. PATENT DOCUMENTS

| | | | |
|---|---|---|---|
| 9,212,815 B2* | 12/2015 | Truong | G06F 1/1637 |
| 9,432,612 B2 | 8/2016 | Bruhn | |
| 9,441,830 B2* | 9/2016 | Truong | F21V 33/0052 |
| 9,554,447 B2 | 1/2017 | Rains, Jr. | |
| 10,216,264 B2* | 2/2019 | Mao | G09G 5/10 |
| 10,726,463 B2* | 7/2020 | Cho | G06Q 30/04 |
| 2015/0098143 A1 | 4/2015 | Anderson | |
| 2016/0140887 A1* | 5/2016 | Kim | G09G 3/3406 |
| | | | 345/690 |
| 2016/0231573 A1* | 8/2016 | Mullins | G02B 27/017 |
| 2017/0231052 A1* | 8/2017 | Li | H04N 5/58 |

(Continued)

FOREIGN PATENT DOCUMENTS

WO 2018093661 A1 5/2018

OTHER PUBLICATIONS

"Why ambient light is key to your TV viewing experience," Pocket-lint Promotion, Dec. 11, 2017, Retrieved from the Internet: URL: https://www.pocket-lint.com/tv/news/philips/143034-why-ambient-light-is-key-to-your-tv-viewing-experience [retrieved on Jul. 23, 2018].

*Primary Examiner* — Rodney Amadiz
(74) *Attorney, Agent, or Firm* — Blank Rome LLP

(57) ABSTRACT

An apparatus includes a transceiver and a controller in communication with the transceiver. The controller is configured to determine a target lighting condition in a room relative to a current lighting condition in the room. The controller is also configured to generate a control signal with instructions to adjust an ambient lighting peripheral in the room based on the determined target lighting condition. The control signal is provided to the transceiver for transmission.

18 Claims, 4 Drawing Sheets

(56) References Cited

U.S. PATENT DOCUMENTS

2017/0265272 A1\* 9/2017 Shan ................ H05B 47/105
2017/0337857 A1   11/2017 Tiberi
2018/0153012 A1\* 5/2018 Lee .................... H04W 4/70
2019/0026874 A1\* 1/2019 Jin ....................... G06T 5/20

\* cited by examiner

DYNAMIC AMBIENT LIGHTING CONTROL

CROSS-REFERENCE TO RELATED APPLICATIONS

The present application claims priority to U.S. Provisional Patent Application No. 62/738,899, filed Sep. 28, 2018.

BACKGROUND

In an example computer-generated reality (CGR) scenario, a head-mounted device is used to cover the eyes of its user, and CGR content is displayed by the head-mounted device. One of the challenges for successfully commercializing CGR devices relates to providing a quality experience to the user. Merely providing a head-mounted device and CGR content is not effective if the quality of the CGR experience is deficient.

One option to provide CGR content involves use of one or more cameras on the head-mounted device (e.g., a camera captures images of what the user would see without the head-mounted device). In this scenario, captured camera images can be combined with CGR content to display what has been referred to as "mixed reality" content on the head-mounted device. Improving the quality of CGR content, including mixed reality content, is not a trivial task. There are conflicting limitations related to cameras, content generation, display quality, processing speed, and system cost that have not been adequately resolved.

SUMMARY

In accordance with at least one embodiment of the disclosure, an apparatus comprises a transceiver and a controller in communication with the transceiver. The controller is configured to determine a target lighting condition in a room relative to a current lighting condition in the room. The controller is also configured to generate a control signal with instructions to adjust an ambient lighting peripheral in the room based on the determined target lighting condition. The control signal is provided to the transceiver for transmission.

In accordance with at least one embodiment of the disclosure, a system comprises a head-mounted device configured to capture camera image data and to display computer-generated reality content. The system also comprises at least one ambient lighting peripheral. The system also comprises a controller configured to determine a target ambient lighting condition relative to a current ambient lighting condition based on camera image data captured by the HMD. The controller is configured to provide control signals to adjust the at least one ambient lighting peripheral based on the target ambient lighting condition.

In accordance with at least one embodiment of the disclosure, a method comprises receiving image data captured by at least one camera. The method also comprises determining a current ambient lighting condition based at least in part on the received image data. The method also comprises using the current ambient lighting condition and a target criteria to determine a target ambient lighting condition. The method also comprises conveying a control signal to adjust an ambient lighting peripheral based on the target ambient lighting condition. The method also comprises displaying computer-generated reality content on a head-mounted device after adjustment of the ambient lighting peripheral using the control signal.

BRIEF DESCRIPTION OF THE DRAWINGS

For a detailed description of various examples, reference will now be made to the accompanying drawings in which.

DETAILED DESCRIPTION

Figure 1:
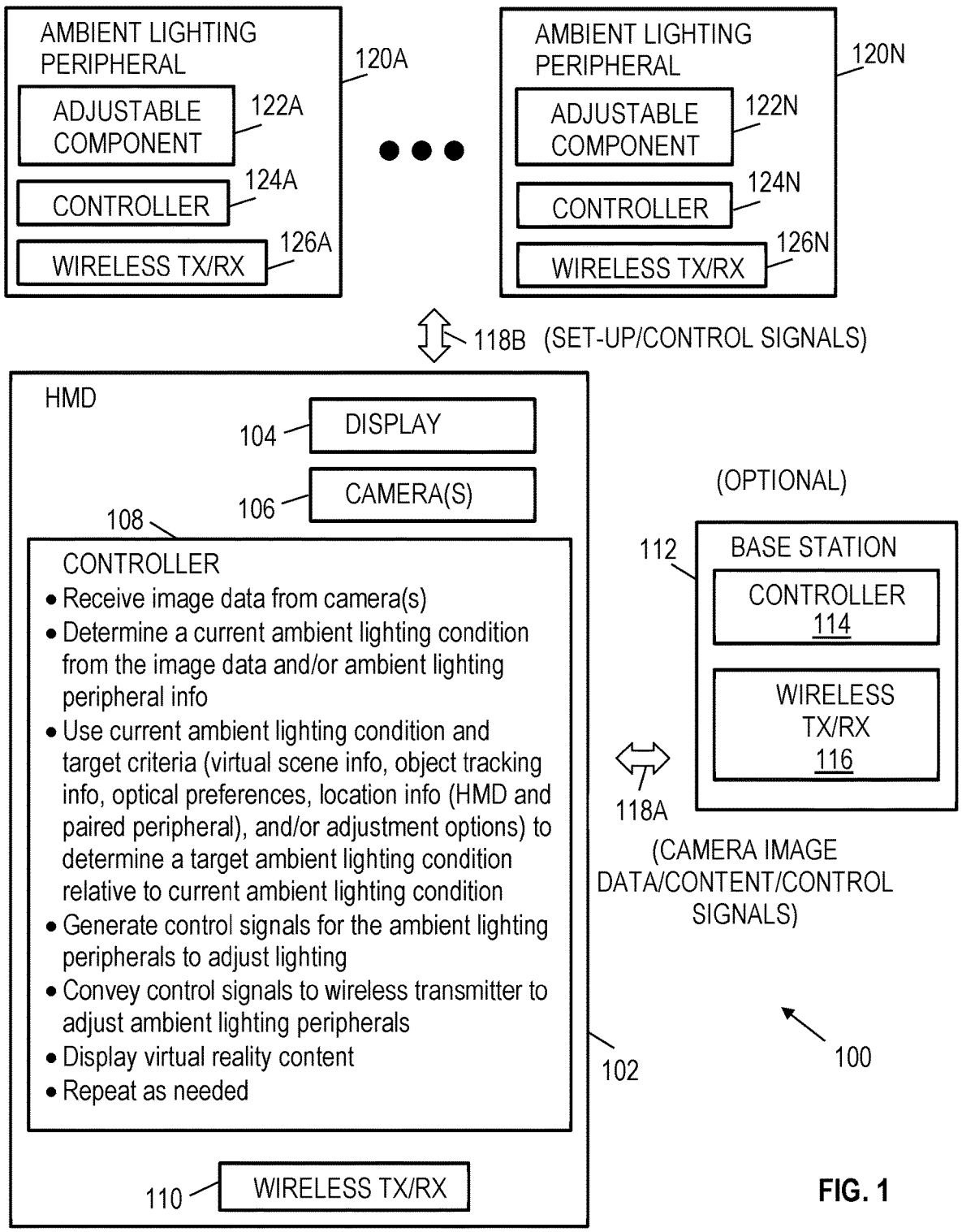
FIG. 1 is a block diagram showing a system in accordance with various embodiments.

Disclosed herein are devices, systems, and related methods for dynamic ambient lighting control for scenarios where a head-mounted device (HMD) displays computer-generated reality content. Various terms related to computer-generated reality are discussed below to aid the reader. As used herein, "physical environment" refers to a physical world that people can sense and/or interact with without aid of electronic systems. Example physical environments include a physical park with physical articles, such as physical trees, physical buildings, and physical people. People can directly sense and/or interact with the physical environment, such as through sight, touch, hearing, taste, and smell. As used herein, a "computer-generated reality (CGR) environment" refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. As used herein, a "virtual reality (VR) environment" refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment. In contrast to a VR environment, which is designed to be based entirely on computer-generated sensory inputs, a "mixed reality (MR) environment" refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. As used herein, an "augmented reality (AR) environment" refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

As used herein, an "augmented reality environment" also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

As used herein, an "augmented virtuality (AV) environment" refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Regardless of the particular type of CGR content being displayed (e.g., by an HMD), the ambient lighting can affect the displayed CGR content. Accordingly, disclosed devices, systems, and methods support dynamic ambient lighting control, where the ambient lighting is adjusted in response to CGR content displayed or CGR content to be displayed by the HMD. In different embodiments, the HMD displays CGR content using a screen or holographic components.

In at least some embodiments, a CGR system includes an HMD and at least one ambient lighting peripheral, where the HMD receives image data from one or more cameras. The image data is used to determine a current ambient lighting condition. As another option, ambient lighting peripheral information (e.g., location and/or current settings information) is used to determine a current ambient lighting condition. Thereafter, a target ambient lighting condition relative to the current ambient lighting condition is determined. In some embodiments, the target ambient lighting condition is determined based on the current ambient lighting condition and target criteria. Example target criteria include CGR scene information, object tracking information (e.g., hand tracking information), optical preferences (e.g., application-specification preferences and/or a minimum brightness setting/threshold), location info (e.g., HMD and paired peripheral location information), and/or adjustment options (e.g., a brightness range supported by an ambient lighting peripheral, a color temperature range supported by an ambient lighting peripheral, a mechanical actuator position range supported by an ambient lighting peripheral).

Once the target ambient lighting condition is determined, control signals are generated, as needed, to adjust one or more ambient lighting peripherals in the same room or space as the HMD. Example parameters that can be adjusted include, but are not limited to, brightness (e.g., a range of lumens), color temperature (e.g., a range of visible colors), and mechanical actuator position (e.g., a range of actuator positions that change the position/orientation of a window shade or light source). In at least some examples, the control signals for ambient lighting peripherals are transmitted wirelessly. Once adjustments to one or more ambient lighting peripherals are complete (resulting in the target ambient lighting condition), the HMD displays CGR content, where the appearance of the CGR content displayed by the HMD is affected by the ambient lighting condition. As desired, the above-described ambient lighting control process is repeated over time to adjust ambient lighting dynamically while the HMD displays CGR content.

With the disclosed ambient light control technique, pass-through video is modified without the computational expense of making those changes in the video rendering pipeline. For example, rather than apply a color filter to the pass-through video to make a CGR scene red, the ambient lighting is modified so that captured camera images are of a red environment.

With at least some embodiments of the disclosed ambient light control technique, matching the ambient brightness/color to CGR content being shown on the display is not the goal. Also, with at least some embodiments of the disclosed ambient light control technique, influencing a user's perception of visual content based on the user's visual adaptation is not the goal. Rather, the disclosed ambient light control technique enables adjusting the ambient lighting conditions to reflect the impact that a virtual object should have on the real environment. For example, if CGR content includes a virtual glowing blue orb, a user would expect that the real environment near that orb would look blue. As the orb moves, the blue glow in the room should move with it. Rather than performing computationally-expensive image processing to provide CGR content involving the blue orb, the disclosed ambient light control technique enables changes to the color of a light bulb in the room near the orb to be blue.

In at least some embodiments, the disclosed CGR system stored information regarding all the virtual light sources and how the AR environment should look, as well as knowledge of the real world light sources, their capabilities, and locations, to make the appropriate lighting changes. As needed, there can be some spatial component where different real world lights have different colors and brightnesses based on the virtual light sources in the AR environment.

In some embodiments, the ambient lighting conditions are adjusted based on the requirements of the HMD. As an example, if a camera, application and/or computer vision algorithm of the HMD has a minimum or target brightness requirement, the ambient lighting can be adjusted to ensure that the minimum or target brightness requirement is being met. In some embodiments, the minimum or target brightness requirement is based on light measurements from the HMD, rather than a setting of the bulb since the light received by the camera depends on more than just the brightness of the bulb.

In some embodiments, the HMD performs the above-described ambient lighting control process to adjust ambient lighting dynamically. In other embodiments, a CGR system includes a base station in addition to the HMD and the at least one ambient lighting peripheral. In such embodiments, the base station performs at least some of the above-described ambient lighting control process. As needed, the HMD and the base station convey information to each other via a wireless communication channel while performing the above-described ambient lighting control process and/or CGR content generation. To provide a better understanding, various devices, systems, and related methods for dynamic ambient lighting control for scenarios where a HMD displays CGR content are described using the figures as follows.

FIG. 1 is a block diagram showing a system 100 in accordance with various embodiments. As shown, the system 100 includes an HMD 102 and a plurality of ambient lighting peripherals 120A-120N. More specifically, the HMD 102 includes a display 104 such as a liquid crystal display (LCD) display, an organic light-emitting diode (OLED) display, or a holographic display. Also, the HMD 102 includes camera(s) 106. In some embodiments, the camera(s) 106 capture ambient environment images corresponding to what a user would see. Additionally or alternatively, the camera(s) 106 capture images of a user's face (e.g., to track facial expressions), eyes, and/or hands (e.g., to track hand motions). A controller 108 of the HMD 102 performs various operations to enable dynamic ambient lighting control. The controller 108 may also perform other operations related to generating or displaying CGR content. In some embodiments, the controller 108 corresponds to at least one processor and computer-readable medium with software instructions to perform the ambient lighting control process described herein.

As shown, example operations of the controller 108 include receiving image data from the camera(s) 106 and determining a current ambient lighting condition from the image data and/or current settings of the ambient lighting peripherals 120A-120N. Other example operations of the controller 108 include using the current ambient lighting condition and target criteria (e.g., CGR scene info, object tracking info, optical preferences, location information of the HMD 102, location information of the ambient lighting peripheral 120A-120N, and/or adjustment options (e.g., a brightness range supported by an ambient lighting peripheral, a color temperature range supported by an ambient lighting peripheral, a mechanical actuator position range supported by an ambient lighting peripheral) to determine a target ambient lighting condition relative to the current ambient lighting condition. In at least some scenarios, "optical preferences" refer to user preferences, application preferences and/or equipment preferences (e.g., the minimum lighting conditions required by optics of a camera for a given aperture and ISO). Other example operations of the controller 108 include generating control signals for one or more of the ambient lighting peripherals 120A-120N based on the target ambient lighting condition. In some embodiments, each control signal includes instructions for adjusting the brightness, the color temperature, and/or the mechanical actuator position for a given ambient lighting peripheral.

In FIG. 1, the ambient lighting peripherals 120A-120N are in the same room or space as the HMD 102 such that ambient lighting controlled by the ambient lighting peripherals 120A-120N affect the appearance of CGR content displayed by the HMD 102. In other examples, less than all of the ambient lighting peripherals 120A-120N are in the same room or space as the HMD 102 (e.g., the ambient lighting peripherals 120A-120N are distributed throughout different rooms of a house or office space). In such case, a single ambient lighting peripheral or a sub-set of the ambient lighting peripherals 120A-120N are adjusted depending on the target ambient lighting condition and the location of the HMD 102 relative to the ambient lighting peripherals 120A-120N.

As shown, each of the ambient lighting peripherals 120A-120N includes a respective wireless transceiver 126A-126N, a respective controller 124A-124N, and a respective adjustable component 122A-122N. Using the ambient lighting peripheral 120A as an example, the wireless transceiver 126A enables information to be conveyed to or from the ambient lighting peripheral 120A. The information provided to or from the ambient lighting peripheral 120A is managed by the controller 124A in response to predetermined instructions and/or a query-based protocol. In some embodiments, HMD 102 stores the information necessary to provide instructions to the ambient lighting peripheral 120A in response to target ambient lighting condition updates. As an example, in response to an instruction to update operations of the ambient lighting peripheral 120A, the controller 124A directs the adjustable component 122A according to a predetermined control protocol. Example adjustments for the adjustable component 122A include brightness adjustments (adjusting lumens from one value to another value within a given range), color temperature adjustments (adjusting color from one value to another value within a given range), and/or mechanical actuator position adjustments (adjusting the actuator position from one value to another value within a given range). In some embodiments, the other ambient lighting peripherals 120B-120N and respective components follow the discussion provided for the ambient lighting peripheral 120A. Further, in some embodiments, different ones of the ambient lighting peripherals 120A-120N vary with regard to the adjustable component used. As an example, the adjustable component for a given ambient lighting peripheral may correspond to a "smart" light bulb that supports adjustments to brightness, color temperature, and/or light bulb position/orientation. As another examples, the adjustable component for an ambient lighting peripheral may correspond to a "smart" window shade/curtain that supports adjustments to an actuator position (e.g., a motor, a linear actuator with piston, or other actuator) to change the position or orientation of a window shade/curtain.

Other example operations of the controller 108 include conveying the generated control signals to adjust one or more of the ambient lighting peripherals 120A-120N based on the target ambient lighting condition. In FIG. 1, control signals and/or set-up information is conveyed between the HMD 102 and the ambient lighting peripherals 120A-120N via a wireless communication channel 118B. In some embodiments, control signals are conveyed to one or more of the ambient lighting peripherals 120A-120N using a wireless transceiver 110 of the HMD 102 and respective transceivers 126A-126N of the ambient lighting peripherals 120A-120N. Once adjustments to one or more of the ambient lighting peripherals 120A-120N is complete (e.g., the adjustment can be detected and/or an adjustment time interval can be set), CGR content is displayed by the HMD 102, where the ambient lighting adjustments affect the appearance of the CGR content displayed by the HMD 102.

In FIG. 1, the system 100 optionally includes a base station 112 with a controller 114 and a wireless transceiver 116. In some embodiments, the controller 114 corresponds to at least one processor and a computer-readable medium with software instructions. In one embodiment, the controller 114 performs at least some of the operations discussed with regard to the controller 108. Additionally or alternatively, the controller 114 generates CGR content for the HMD 102. As desired, the wireless transceiver 116 enables the base station 112 to send information to and receive information from (e.g., set-up information and/or control signals) the ambient lighting peripherals 120A-120N via the wireless communication channel 118B. Also, as desired, the base station 112 and the HMD 102 exchange information (e.g., camera images, CGR content, current ambient lighting condition information, target criteria, target ambient lighting condition information, control signals) via a wireless communication channel 118A while performing the ambient lighting control process described herein and/or CGR content generation.

Figure 2:
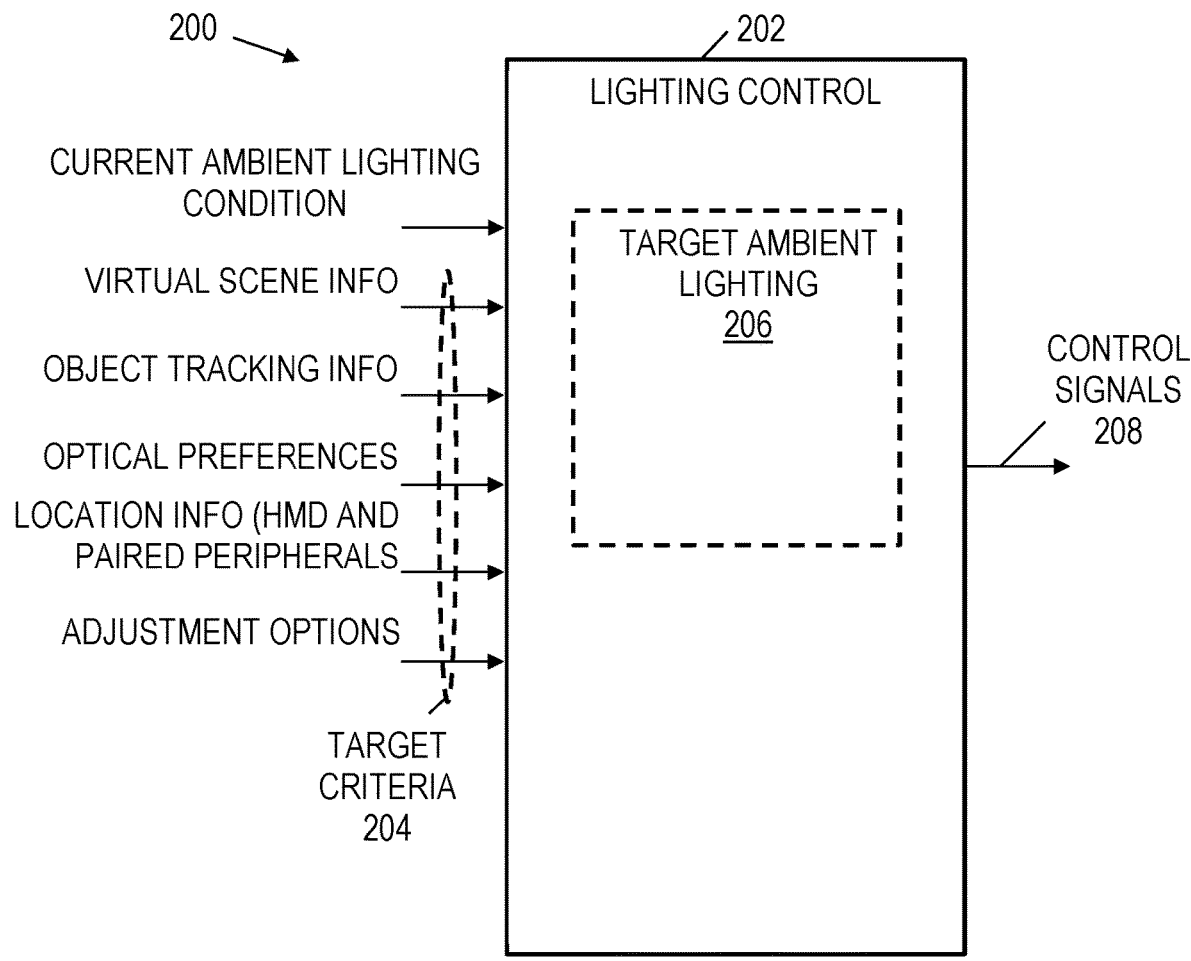
FIG. 2 is a block diagram showing an ambient lighting control scenario in accordance with various embodiments.

FIG. 2 is a block diagram showing an ambient lighting control scenario 200 in accordance with various embodiments. In scenario 200, a lighting control unit 202 receives a current ambient lighting condition and target criteria 204 such as CGR scene information (e.g., CGR scene color(s) or brightness/dimness), object tracking information (e.g., if hand tracking is needed for a particular CGR scenario), optical preferences (application-specific preferences, user preferences, and/or a minimum brightness value), HMD location information, ambient lighting peripheral location information, and adjustment options (e.g., a brightness range supported by an ambient lighting peripheral, a color temperature range supported by an ambient lighting peripheral, a mechanical actuator position range supported by an ambient lighting peripheral). Based on the current ambient lighting condition and the target criteria 204, the lighting control unit 202 uses target ambient lighting information 206 (e.g., instructions, rules, and/or data) to determine a target ambient light condition from which control signals 208 are generated for ambient lighting peripherals as described herein. In some embodiments, if multiple target criteria is available, different levels of priority for the target criteria may be used to determine the target ambient light condition.

In some embodiments, the lighting control unit 202 corresponds to hardware, firmware, and/or software components of an HMD such as the HMD 102 of FIG. 1. Additionally or alternatively, the lighting control unit 202 corresponds to hardware, firmware, and/or software components of a CGR system base station such as the base station 112 of FIG. 1.

Figure 3:
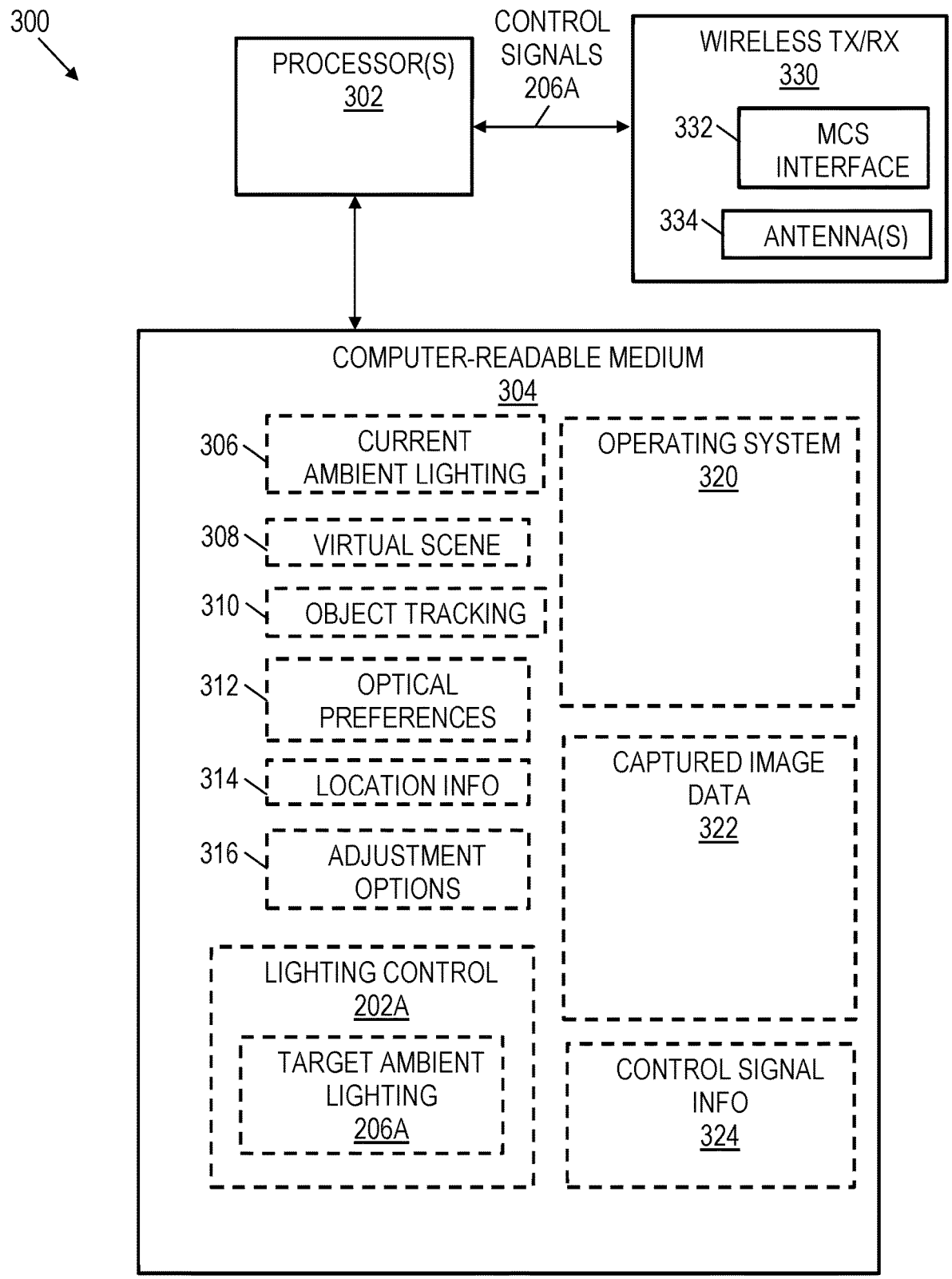
FIG. 3 is a block diagram showing a computer system in accordance with various embodiments.

FIG. 3 is a block diagram showing a computer system 300 in accordance with various embodiments. As shown, the computer system 300 includes processor(s) 302 in communication with a computer-readable medium 304 (e.g., RAM memory, ROM memory, Flash memory, or combinations thereof). In different examples, the processor(s) 302 correspond to one or more central processing units (CPUs), one or more microprocessors, one or more graphics processors, and/or one or more application-specific processors.

In the example of FIG. 3, the computer-readable medium 304 stores data or instructions that, when executed by the processor(s) 302, perform the ambient lighting control operations described herein. More specifically, the computer-readable medium 304 stores current ambient lighting information 306, which corresponds to instructions, rules, and/or data for determining a current ambient lighting condition. In some embodiments, current ambient lighting information 306 uses captured image data 322 (e.g., images captures by the camera(s) 106 of FIG. 1) stored by the computer-readable medium 304 to determine the current ambient lighting condition. Additionally or alternatively, in some embodiments, ambient lighting peripheral information (e.g., obtained from the location information 314 and/or adjustment options information 316 stored by the computer-readable medium 304) is used to determine the current ambient lighting condition.

In the example of FIG. 3, the computer-readable medium 304 also includes various target criteria in the form of CGR scene information 308, object tracking information 310, optical preferences information 312, location information 314, and adjustment options information 316. More specifically, the CGR scene information 308 includes instructions, rules, and/or data for obtaining CGR scene attributes that can be used as target criteria to determine a target ambient lighting condition. Meanwhile, the object tracking information 308 includes instructions, rules, and/or data for obtaining object tracking attributes that can be used as target criteria to determine a target ambient lighting condition. Also, optical preferences information 312 includes instructions, rules, and/or data for obtaining optical preferences that can be used as target criteria to determine a target ambient lighting condition. Example optical preferences include a calculated or selected minimum brightness level based on CGR scene attributes and/or object tracking attributes. The location information 314 includes instructions, rules, and/or data for obtaining HMD and/or peripheral location attributes (a position relative to each other and/or relative to a focal point in a room or space) that can be used as target criteria to determine a target ambient lighting condition. The adjustment options information 316 includes instructions, rules, and/or data for obtaining ambient lighting peripheral adjustment options (e.g., a brightness range supported by an ambient lighting peripheral, a color temperature range supported by a ambient lighting peripheral, a mechanical actuator position range supported by a ambient lighting peripheral) that can be used as target criteria to determine a target ambient lighting condition.

In the example of FIG. 3, the computer-readable medium 304 stores a lighting control unit 202A, which is an example of the lighting control unit 202 introduced in FIG. 2. Likewise, the target ambient lighting information 206A is an example of the target ambient lighting information 206 introduced in FIG. 2. In operation, the lighting control unit 202 provides instructions, rules, and/or data that, when executed by the processor(s) 302, use the current ambient lighting information 306 and the target criteria to determine a target ambient lighting condition. Subsequently, control signal information 324 (e.g., instructions, results, and/or data) is executed by the processor(s) 302 to determine control signals for available ambient lighting peripherals based on the target ambient lighting condition.

In one example, a CGR scenario includes an HMD (e.g., HMD 102) in a home or office space with ambient lighting peripherals (e.g., ambient lighting peripherals 120A-120N) in the form of "smart" light bulbs or "smart" window shades/curtains. To set up ambient lighting control, the HMD and/or base station receives ambient lighting peripheral location information and/or adjustment options via a user interface. As another option, the HMD and/or base station is able to query ambient lighting peripherals to receive location information and/or adjustment options. Once the ambient lighting peripheral location information, the adjustment options, the HMD location, and/or other target criteria are established (automatically or via user/application input), ambient lighting control operations are performed as described herein. If the target criteria changes (e.g., due to movement of the HMD, CGR scene changes, and/or application changes), the target criteria will be updated resulting in updates to the target ambient lighting condition.

In one example, a CGR scenario includes an HMD in a living room with an ambient lighting peripheral in the form of a "smart" light bulb, where the CGR scene to be displayed on the HMD includes a dim sunset with orange colors. Also, a minimum brightness setting of 0.3 lumens is selected or predetermined for the CGR scenario. In response to this CGR scenario, the lighting control unit 202 provides a control signal for the ambient lighting peripheral in the living room to adjust its color temperature to orange and its brightness to 0.3 lumens.

In another example, a CGR scenario includes an HMD in a bedroom with an ambient lighting peripheral in the form of a "smart" light bulb, where the CGR scene to be displayed on the HMD includes a CGR starlight scene with dim blue colors. Also, a minimum brightness setting of 0.2 lumens is selected or predetermined for the CGR scenario. In response to this CGR scenario, the lighting control unit 202 provides a control signal for the ambient lighting peripheral in the bedroom to adjust its color temperature to blue and its brightness to 0.2 lumens.

In another example, a CGR scenario includes an HMD in a conference room with an ambient lighting peripheral in the form of a "smart" window shade, where CGR content to be displayed by the HMD is dim and is based at least in part on object tracking (e.g., hand tracking). Also, a minimum brightness setting of 0.4 lumens is selected or predetermined for object tracking scenarios. In response to this CGR scenario, the lighting control unit 202 provides a control signal for the ambient lighting peripheral in the conference room to adjust brightness to 0.4 lumens by adjusting a mechanical actuator position to cause the window shade to cover at least part of a window. As needed, further ambient lighting adjustments are performed based on a feedback loop that compares a current ambient lighting condition with a target ambient lighting condition.

In another example, a CGR scenario includes an HMD in a conference room with multiple ambient lighting peripherals in the form of "smart" light bulbs, where CGR content to be displayed by the HMD has a focal point in the conference room. In response to this CGR scenario, the lighting control unit 202 provides control signals for individual ambient lighting peripherals in the conference room to adjust their respective brightness and/or color temperature to highlight the focal point in the conference room.

In the example of FIG. 3, the computer-readable medium 304 also includes an operating system 320. When executed by the processor(s) 302, the operating system 320 supports various CGR functions and/or user interface functions, including the ambient lighting control operations described herein. In some embodiments, the operating system 320 includes the lighting control unit 202A and/or the information used to perform ambient lighting control operations (e.g., information 306, 308, 310, 312, 314, 316, and 324). In some embodiments, the operating system 320 has access to a cloud-stored repository (e.g., iCloud or other cloud-based storage accessible using login credentials) of ambient lighting peripheral information. In some embodiments, the operating system 320 uses an ambient lighting peripheral protocol (e.g., HomeKit) to perform the ambient lighting control operations described herein.

In one embodiment, the computer system 300 represents components of an HMD such as the HMD 102 in FIG. 1. In another embodiment, the computer system 300 represents components of a base station in a CGR system (e.g., the base station 112 in FIG. 1). In some embodiments, both the HMD 102 and the base station 112 include some or all of the components represented in FIG. 3. As desired, some redundancy of components and operations can be performed in a CGR system to achieve the ambient lighting control operations described while accounting for distributed workload options, variable workload scenarios of the base station 112, variable workload scenarios of the HMD 102, and/or varying bandwidth conditions of the wireless communication channel 118A and 118B. In one example, if the wireless communication channel 118A has a bandwidth below a threshold, only the HMD 102 performs the ambient lighting control operations described herein. In another example, if the wireless communication channel 118A has a bandwidth below a threshold, the base station 112 performs the ambient lighting control operations described herein with no camera image data or less camera image data being transferred from the HMD 102 to the base station 112. In such case, the base station 112 is able to use a default ambient lighting condition, a previous ambient lighting condition, default peripheral settings, or previous peripheral settings to determine the current ambient lighting condition. As another option, a target ambient lighting condition is determined without knowledge of the current ambient lighting condition based on available target criteria.

Once control signals are determined (e.g., by the processor(s) 302 executing the control signal information 324 with the latest target ambient lighting condition information), these same control signals or related control signals 206A (an example of the control signals 206 in FIG. 2) are provided to the wireless transceiver 330 in communication with the processor(s) 302. In the example of FIG. 3, the wireless transceiver 330 includes a modulation and coding scheme (MCS) interface 332, which prepares data packets with the control signals 206A for transmission via antenna(s) 334 to a wireless communication channel such as the communication channels 118A and 118B in FIG. 1. As desired, the MCS interface 332 can adjust the modulation and/or coding of the control signals 206A to account for changing bandwidth conditions of a wireless communication channel. The wireless transceiver 330 can also be used to send/receive camera images, peripheral set-up information, CGR content, and/or other information exchanged in a CGR system such as the system 100 of FIG. 1.

Figure 4:
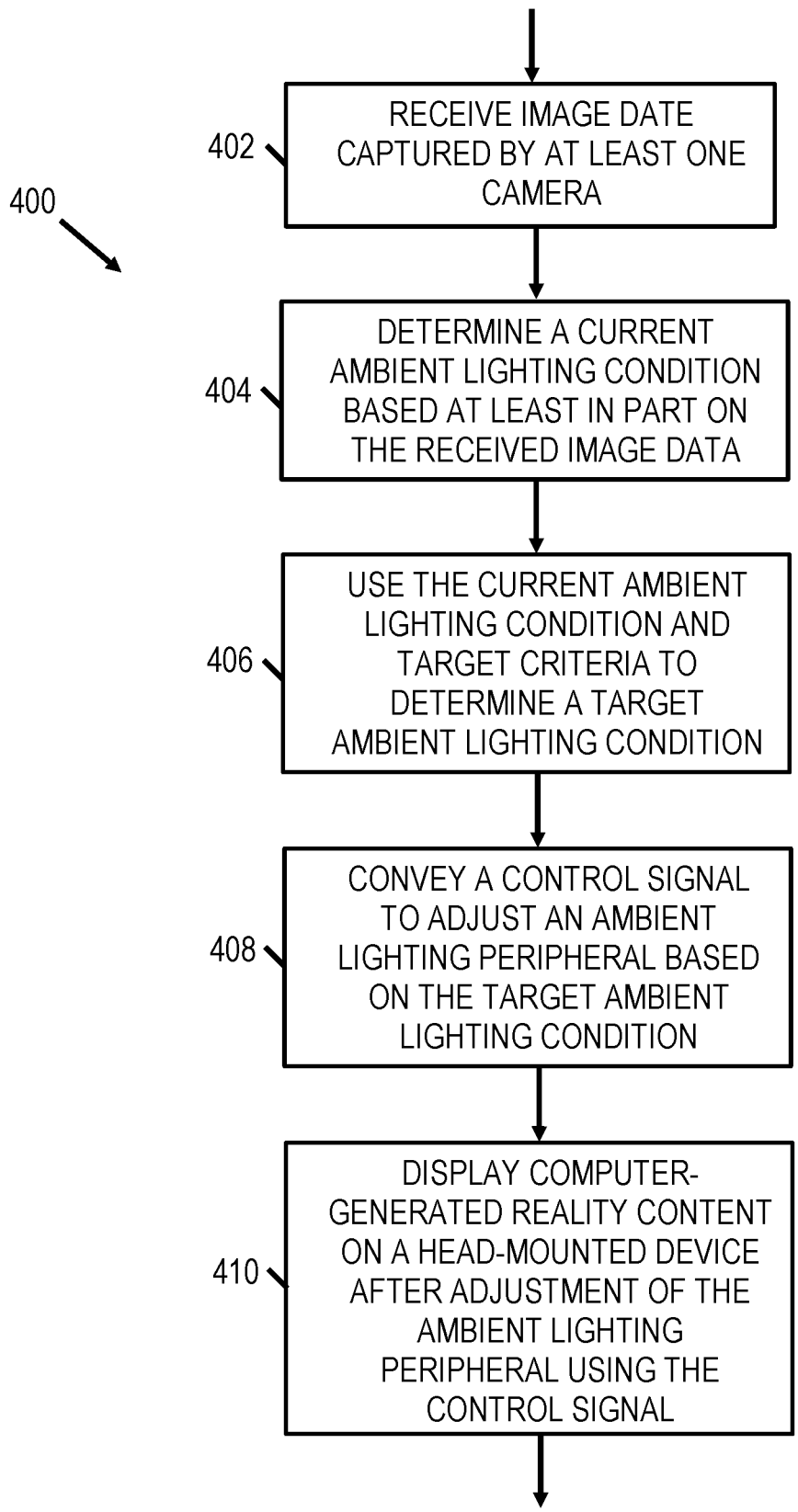
FIG. 4 is a flow chart showing an ambient lighting control method in accordance with various embodiments.

FIG. 4 is a flow chart showing an ambient lighting control method 400 in accordance with various embodiments. As shown, the method 400 comprises receiving image data captured by at least one camera at block 402. At block 404, a current ambient lighting condition is determined based at least in part on the received image data. At block 406, the current ambient lighting condition and target criteria are used to determine a target ambient lighting condition. In various embodiments, the target criteria comprises one or more of computer-generated reality scene information, object tracking information, ambient lighting peripheral location information, and a minimum brightness threshold.

At block 408, a control signal is conveyed to adjust an ambient lighting peripheral based on the target ambient lighting condition. At block 410, computer-generated reality content is displayed on an HMD after adjusted of the ambient lighting peripheral using the control signal. In some embodiments, the method 400 is performed by an HMD. In other embodiments, at least some of the method 400 is performed by a base station (e.g., base station 112 of FIG. 1). For example, in some embodiments, a base station performs the operations of blocks 402, 404, 406, and 408, and an HMD performs the operations of block 410. As another example, in some embodiments, a base station performs the operations of block 408, and an HMD performs the operations of block 402, 404, 406, and 410. Other workload variations of the HMD and base station to perform dynamic ambient lighting control are possible.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus that comprises: a transceiver; and a controller in communication with the transceiver, wherein the controller is configured to determine a target ambient lighting condition in a room relative to a current lighting condition in the room, wherein the controller is configured to generate a control signal with instructions to adjust an ambient lighting peripheral in the room based on the determined target ambient lighting condition, wherein the controller is configured to determine the target ambient lighting condition based on a computer-generated reality scene separate from captured camera image data, and wherein the control signal is provided to the transceiver for transmission.

2. The apparatus of claim 1, wherein the apparatus is a base station configured to provide computer-generated reality content for a head-mounted device based on captured camera image data.

3. The apparatus of claim 1, wherein the apparatus is the head-mounted device, and wherein apparatus further comprises:
a camera configured to capture image data from which the current lighting condition in the room is determined; and
a display configured to display computer-generated reality content with the captured image data in the target ambient lighting condition.

4. The apparatus of claim 1, wherein the controller is configured to generate a control signal with instructions to adjust at least one of:
a brightness parameter of the ambient lighting peripheral based on the determined target ambient lighting condition; and
a color temperature parameter of the ambient lighting peripheral based on the determined target ambient lighting condition.

5. The apparatus of claim 1, wherein the controller is configured to generate a control signal with instructions to adjust a mechanical actuator position of the ambient lighting peripheral based on the determined target ambient lighting condition.

6. The apparatus of claim 1, wherein the controller is configured to determine the target ambient light condition based on at least one optical preference setting, wherein the at least one optical preference setting comprises a minimum brightness setting.

7. The apparatus of claim 1, wherein the controller is configured to determine the target ambient light condition based on an object tracking criteria, wherein the object tracking criteria is a minimum brightness setting for hand tracking operations.

8. The apparatus of claim 1, wherein the controller is configured to determine the target ambient light condition based on location information for the lighting control peripheral, and wherein the controller stores location information and lighting adjustment parameters associated with the ambient lighting peripheral.

9. The apparatus of claim 8, wherein the controller provides an interface that enables a user to pair with the ambient lighting peripheral and to enter at least one of location information and lighting adjustment parameters associated with the ambient lighting peripheral.

10. The apparatus of claim 8, wherein the controller provides an interface that enables ambient lighting peripherals to be automatically paired and queried, wherein location information and lighting control parameters associated with paired ambient lighting peripherals are stored by the controller.

11. A system that comprises:
a head-mounted device (HMD) configured to capture camera image data and to display computer-generated reality content;
at least one ambient lighting peripheral; and
a controller configured to determine a target ambient lighting condition relative to a current ambient lighting condition based on camera image data captured by the HMD, and wherein the controller is configured to provide control signals to adjust the at least one ambient lighting peripheral based on the target ambient lighting condition, wherein the target ambient lighting condition is a function of the current ambient lighting condition and computer-generated reality scene information separate from the captured camera image data.

12. The system of claim 11, further comprising a base station, wherein at least one of the HMD and the base station includes the controller and is configured to determine the computer-generated reality content to be displayed by the HMD.

13. The system of claim 11, further comprising a base station, wherein at least one of the HMD and the base station includes the controller and is configured to determine the target lighting condition relative to a current lighting condition based in part on camera image data captured by the HMD.

14. The system of claim 11, further comprising a base station, wherein at least one of the HMD and the base station includes the controller and is configured to generate a control signal with instructions to adjust the at least one ambient lighting peripheral based on the determined target lighting condition while the computer-generated reality content is displayed by the HMD.

15. The system of claim 11, wherein the target ambient lighting condition is a function of object tracking information or ambient lighting peripheral location information.

16. A method that comprises:
receiving image data captured by at least one camera;
determining a current ambient lighting condition based at least in part on the received image data;
using the current ambient lighting condition and a target criteria to determine a target ambient lighting condition, wherein the target criteria comprises computer-generated reality scene information separate from the received image data;
conveying a control signal to adjust an ambient lighting peripheral based on the target ambient lighting condition; and
displaying computer-generated reality content on a head-mounted device after adjustment of the ambient lighting peripheral using the control signal.

17. The method of claim 16, wherein the target criteria comprises at least one of object tracking information and a minimum brightness threshold.

18. The method of claim 16, wherein the target criteria comprises ambient lighting peripheral location information.

* * * * *